US009550494B2

(12) United States Patent
Aso

(10) Patent No.: US 9,550,494 B2
(45) Date of Patent: Jan. 24, 2017

(54) DRIVING ASSISTANCE APPARATUS

(71) Applicant: TOYOTA JIDOSHA KABUSHIKI KAISHA, Toyota-shi, Aichi-ken (JP)

(72) Inventor: Kazuaki Aso, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/690,576

(22) Filed: Apr. 20, 2015

(65) Prior Publication Data

US 2015/0307095 A1  Oct. 29, 2015

(30) Foreign Application Priority Data

Apr. 28, 2014 (JP) ................................ 2014-092793

(51) Int. Cl.
 *B62D 1/28* (2006.01)
 *B60W 30/12* (2006.01)
 *B60W 30/095* (2012.01)

(52) U.S. Cl.
 CPC .......... *B60W 30/12* (2013.01); *B60W 30/0956* (2013.01)

(58) Field of Classification Search
 CPC .. B60W 30/0956; B62B 5/0083; G08G 1/167; B60T 8/17557; B60R 16/00; B60Q 1/44; B62D 1/28; G05D 1/0219
 USPC ............. 701/1, 2, 41, 50, 301, 414; 340/902
 See application file for complete search history.

(56) References Cited

U.S. PATENT DOCUMENTS

| 6,473,678 | B1* | 10/2002 | Satoh | B62D 1/28 180/168 |
| 2004/0230375 | A1* | 11/2004 | Matsumoto | B60T 8/17557 701/301 |
| 2005/0107931 | A1* | 5/2005 | Shimakage | G08G 1/167 701/41 |
| 2005/0240328 | A1* | 10/2005 | Shirato | B62D 1/286 701/41 |
| 2008/0082261 | A1* | 4/2008 | Tengler | B60R 16/00 701/414 |
| 2008/0122605 | A1* | 5/2008 | Tengler | B60Q 1/44 340/467 |
| 2008/0122652 | A1* | 5/2008 | Tengler | B60Q 1/44 340/902 |

(Continued)

FOREIGN PATENT DOCUMENTS

| EP | 2 025 577 A1 | 2/2009 |
| EP | 2 172 919 A1 | 4/2010 |

(Continued)

*Primary Examiner* — Yuri Kan
(74) *Attorney, Agent, or Firm* — Sughrue Mion, PLLC

(57) ABSTRACT

An apparatus for assisting in the driving of a vehicle determines, for a first vehicle, a first traveling track based on road infrastructure and a second traveling track based on the traveling track of a second vehicle that precedes the first vehicle. The apparatus stores information about the first traveling track and the second traveling track such that the deviation corresponds to the respective traveling positions of the vehicles. If a base for formation of a target track that the first vehicle is caused follow is switched between the first traveling track and the second traveling track when the apparatus forms this target track, the apparatus forms the target track based on the deviation information to decrease deviation between the first traveling track and the second traveling track.

10 Claims, 4 Drawing Sheets

(56) References Cited

U.S. PATENT DOCUMENTS

2011/0112730 A1* 5/2011 Rekow ................ G05D 1/0219
　　　　　　　　　　　　　　　　　　　　　701/50
2015/0286218 A1* 10/2015 Shani .................. B62B 5/0083
　　　　　　　　　　　　　　　　　　　　　701/2

FOREIGN PATENT DOCUMENTS

| EP | 2 436 572 A1 | 4/2012 |
| JP | 10-049672 A | 2/1998 |
| JP | 2001-039326 A | 2/2001 |
| JP | 2004-206275 A | 7/2004 |

* cited by examiner

Fig.6
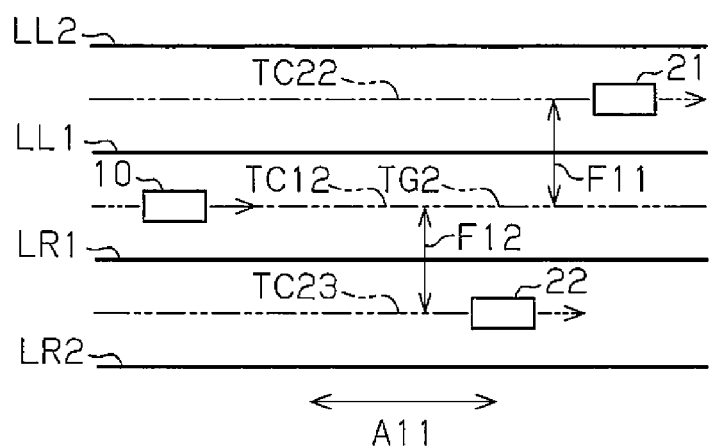
Fig.7
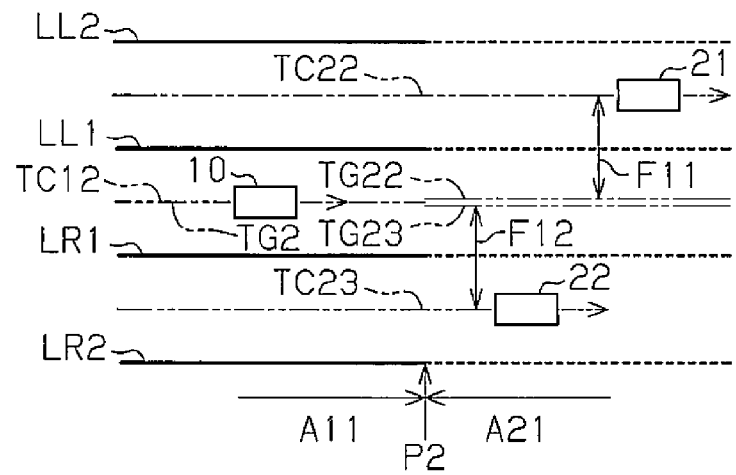
Fig.8
TG22
TG2
TG23

DRIVING ASSISTANCE APPARATUS

BACKGROUND

The present disclosure relates to an apparatus for assisting in the driving of a vehicle.

Conventionally, an apparatus that uses lane keeping assist (LKA) to assist in driving is known. This device recognizes lane division lines, such as a white line, placed on a road surface and determines a lane used as a target track for the host vehicle, and assists in driving such that the host vehicle is caused to travel along the lane.

A lane division line on a road surface may not be recognizable, for example, due to discontinuity or fading of the lane division line on the road surface, the color of the road surface, reflection from the road surface. Japanese Laid-Open Patent Publication No. 2004-206275 describes an example of a system (driving assistance apparatus) that is able to identify a target track for the host vehicle by recognition of lane division lines and is able to identify one by the traveling track of a preceding vehicle as well.

This system includes, as first travel control means, travel control means for causing the host vehicle to travel along a lane (track) determined based on lane division lines recognized by a lane division line (lane mark) recognizing section. This system also includes, as second travel control means, travel control means for controlling the traveling of the host vehicle such that the host vehicle follows a preceding vehicle recognized by a preceding-vehicle recognizing section. This system exerts automatic driving control for the host vehicle by switching between the first travel control means and the second travel control means. Therefore, for example, when a lane division line can no longer be recognized, this system (driving assistance apparatus) switches the target for the host vehicle to follow from the lane division line to a preceding vehicle, thus continuing keeping assistance.

SUMMARY

In the system (driving assistance apparatus) described in the Patent Document 1, even when a lane division line as a target to be followed can no longer be recognized, vehicle following control is maintained. However, switching between the first traveling control means and second traveling control means may increase movement of the vehicle, with a result that the driver may experience discomfort.

The objective of the present disclosure is to provide a driving assistance apparatus designed that is capable of reducing discomfort experienced by a driver when a target that a vehicle follows is switched between a lane division line and a preceding vehicle.

To achieve the foregoing objective and in accordance with one aspect of the present invention, an apparatus is provided that is configured to assist in driving of a vehicle in order to cause the vehicle to follow a target track. The apparatus includes a first traveling track determining section that determines a first traveling track along which a first vehicle is able to travel based on road infrastructure, a second traveling track determining section that determines a second traveling track along which the first vehicle is able to travel based on the traveling track of a second vehicle that precedes the first vehicle, a deviation information storage section that stores deviation information about deviation between the first traveling track and the second traveling track such that the deviation information corresponds to traveling positions of the vehicles, and a target track formation section that forms, based on either the first traveling track or the second traveling track, a target track that the first vehicle is caused to follow. When a base for formation of the target track is switched between the first traveling track and the second traveling track, the target track formation section forms the target track based on the deviation information to decrease the deviation between the first traveling track and the second traveling track.

In accordance with another aspect of the present invention, a method for assisting in driving of a vehicle in order to cause the vehicle to follow a target track is provided. The method includes: determining a first traveling track along which a first vehicle is able to travel based on road infrastructure; determining a second traveling track along which the first vehicle is able to travel based on the traveling track of a second vehicle that precedes the first vehicle; storing deviation information about deviation between the first traveling track and the second traveling track such that the deviation information corresponds to traveling positions of the vehicles; and forming, based on either the first traveling track or the second traveling track, a target track that the first vehicle is caused to follow. When a base for formation of the target track is switched between the first traveling track and the second traveling track, the target track is formed based on the deviation information to decrease the deviation between the first traveling track and the second traveling track.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which:

FIG. 6 is a schematic view illustrating a mode in which a driving assistance apparatus according to a second embodiment causes a vehicle to follow along the lane division lines;

FIG. 7 is a schematic view illustrating a mode in which the driving assistance apparatus in FIG. 6 cannot recognize a lane division line; and FIG. 8 is a view illustrating that the driving assistance apparatus in FIG. 6 acquires a target track by following the preceding vehicles.

DETAILED DESCRIPTION OF THE PREFERRED EMBODIMENTS

First Embodiment

A driving assistance apparatus 300 according to a first embodiment will now be described with reference to FIGS. 1 to 5.

First, the outline of the driving assistance apparatus 300 will be described. A host vehicle 10 as a first vehicle is an automobile such as a passenger car, a bus, or truck driven by a driver.

The host vehicle 10 has a driving assistance apparatus 300 that provides the host vehicle 10 with steering assistance. The driving assistance apparatus 300 has the function of lane keeping control represented by so-called lane keeping assist (LKA). By virtue of the function, the driving assistance apparatus 300 recognizes, based on left and right lane division lines, the lane in which the host vehicle 10 is traveling, and assists steering of the host vehicle 10 to prevent the host vehicle 10 from deviating from the lane division lines of the recognized lane, in which it is traveling. Additionally, the driving assistance apparatus 300 includes the function of preceding vehicle following control represented by adaptive cruise control (ACC). By virtue of the function, the driving assistance apparatus 300 assists steering and the like of the host vehicle 10 to cause the host vehicle 10 to travel while following a preceding vehicle 20, which is a second vehicle. The driving assistance apparatus 300 provides the host vehicle 10 with driving assistance based on either the lane keeping control or the preceding-vehicle following control according to setting by the driver or according to whether lane division lines can be recognized or not.

With reference to Fig., the host vehicle 10, which is equipped with the driving assistance apparatus 300 of the present embodiment, will be described.

Figure 1:
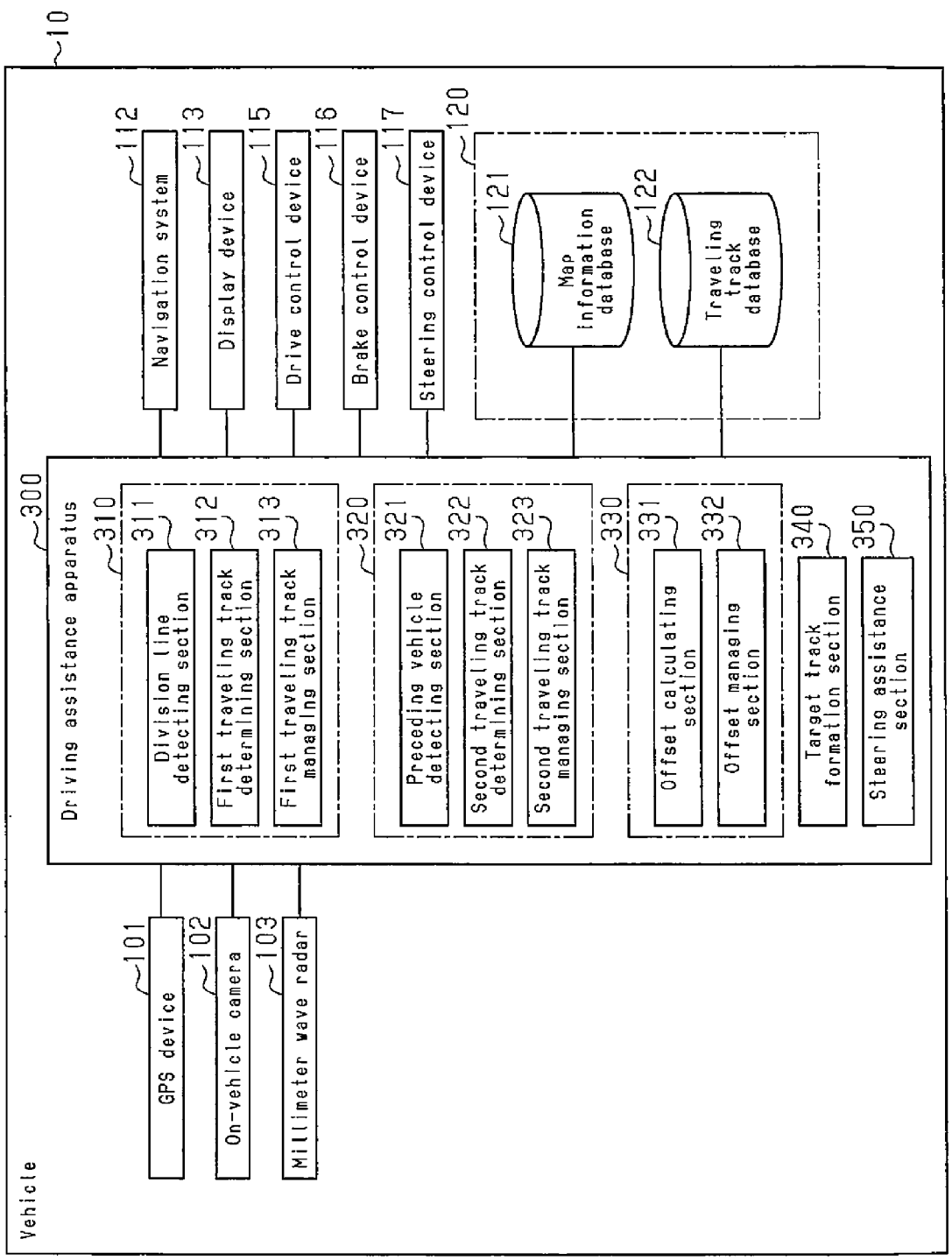
FIG. 1 is a schematic configuration of a driving assistance apparatus according to a first embodiment of this disclosure.

As shown in FIG. 1, the host vehicle 10 includes, as a device for detecting the traveling state of the host vehicle 10, a global positioning system (GPS) device 101, an on-vehicle camera 102, and a millimeter wave radar 103. The GPS device 101, the on-vehicle camera 102, and the millimeter wave radar 103 are connected to a driving assistance apparatus 300, and the like via an on-vehicle network to be able to communicate therewith. Examples of the on-vehicle network include a control area network (CAN).

The GPS device 101 receives a signal from a GPS satellite and, based on this received signal, detects the position of the host vehicle 10 from, for example, latitude and longitude. The GPS device 101 outputs position information, which is information about the detected position (latitude and longitude) of the host vehicle 10, to the driving assistance apparatus 300. The driving assistance apparatus 300 is able to acquire required information about roads and areas from the map information database 121 based on position information or is able to receive route guidance from a navigation system 112.

The on-vehicle camera 102 includes an image pickup section, which picks up an image of at least a visible light region. The on-vehicle camera 102, for example a CCD camera, picks up an image of a surrounding environment of the host vehicle 10 and outputs data about this picked up image to the driving assistance apparatus 300. Images picked up by the on-vehicle camera 102 include images of road infrastructure of a road on which the host vehicle 10 is running, images of preceding vehicles 20 traveling ahead in the advancing direction of the host vehicle 10, and other such images. Examples of road infrastructure include: road markings such as lane division lines; road facilities such as road shape, guard rails, curbstones, side walls, street lamps, and the like; and street trees. Examples of a lane division line include the center line of a driveway, a lane boundary line, a roadway outside line, and other such division lines. Examples of the form of a line include a continuous line, a broken line, a dotted line, or the like, and examples of the color thereof are white, yellow, and the like. The number of preceding vehicles 20 included in an image may be one or may be more than one. From a picked-up image recognition process or the like, the driving assistance apparatus 300 detects vehicle outside environments, for example: the presence or absence of a preceding vehicle 20; the distance between the preceding vehicle 20 and the host vehicle 10; a position, such as lateral deviation, relative to the preceding vehicle 20 in the advancing direction of the vehicle; a speed relative to the preceding vehicle 20; and a target track, which is a traveling target of the host vehicle 10.

The millimeter wave radar 103 detects objects present around the host vehicle 10 by using radio waves of millimeter wave band, and outputs a signal corresponding to the result of this detection to the driving assistance apparatus 300. The millimeter wave radar 103 is able to detect a preceding vehicle 20. For example, the millimeter wave radar 103 is able to detect a preceding vehicle 20, and also detect the distance between the host vehicle 10 and the preceding vehicle 20, a position, such as lateral deviation, relative to the preceding vehicle 20, and a speed relative to the preceding vehicle 20. The preceding vehicle 20 may be determined from a small difference in relative speed between the host vehicle 10 and the preceding vehicle 20. The driving assistance apparatus 300 is able to acquire a relative position and a relative speed between the host vehicle 10 and a preceding vehicle 20 from the result of detection by the millimeter wave radar 103.

The host vehicle 10 includes a nonvolatile storage device 120 including a hard disk drive (HDD) and the like. The nonvolatile storage device 120 of the host vehicle 10 holds a map information database 121 in which map data are registered, and a traveling track database 122, and the like. The map information database 121 and the traveling track database 122 are connected to the driving assistance apparatus 300, and the like, in data read/write mode to be able to communicate therewith. The storage device 120 may be provided in the driving assistance apparatus 300. At this time also, the driving assistance apparatus 300 is able to read or write data in the map information database 121 and traveling track database 122 in the storage device 120.

The map information database 121 is a database for holding map data. The map data includes map information about the geography of roads and the like. In the map information, information about positions such as latitude and longitude and the like are registered together with data and the like such that they are able to display a map. The map data includes specific traffic elements such as intersections, traffic signals, and curves. The map data includes: road information including information about road types, the number of lanes, the width of lanes, the curvature of curves, gradients and the like; intersection information including information about crossings; and other various road information.

The traveling track database 122 is a database that holds the respective traveling tracks of the host vehicle 10 and a preceding vehicle 20, and information about them. The traveling track database 122 holds, as the traveling tracks of the host vehicle 10 and the like and information about them, the traveling position and the time corresponding to the traveling position. This database also holds, for a preceding vehicle 20, information about the deviation of the preceding vehicle 20 from the traveling track of the host vehicle 10. Deviation information is calculated when the host vehicle 10 reaches the traveling position of the preceding vehicle 20. The deviation information includes a separation distance between the traveling track of the host vehicle 10 and the traveling track of the preceding vehicle 20. In other words, the deviation information includes a separation distance between the current traveling position of the host vehicle 10 and the position of the preceding vehicle 20 on its traveling track corresponding to the current traveling position of the host vehicle 10. For instance, when the traveling track of the host vehicle 10 is in the same lane as the traveling track of a preceding vehicle 20, a separation distance is, for example, shorter than the width of a lane or equal to or shorter than the width of the host vehicle 10. Meanwhile, when the traveling track of the host vehicle 10 is in a lane adjacent to the traveling track of a preceding vehicle 20, a separation distance is, for example, longer than the width of the host vehicle 10 or substantially equal to or longer than the lane. A separation distance may include information about vehicle directions, information about vehicle speeds, and the like.

The host vehicle 10 includes a navigation system 112 and a display device 113. The navigation system 112 and the display device 113 are connected to the GPS device 101, the driving assistance apparatus 300, and the like via the on-vehicle network to be able to communicate therewith.

The navigation system 112 acquires the current point (latitude and longitude) of the host vehicle 10 from the GPS device 101. The navigation system 112 searches for a traveling route from the current position of the host vehicle 10 to a destination through referring to the map information database 121. The navigation system 112 outputs information about a traveling route, moving time, and the like, which have been searched for, to the driving assistance apparatus 300 and also outputs them, via communication, to the display device 113, which includes a liquid crystal display and the like, provided in a vehicle cabin.

The host vehicle 10 includes: a drive control device 115 that controls the driving state of an engine, a brake control device 116 that controls the operating state of a brake, and a steering control device 117 that controls the steering state of a steering wheel. The drive control device 115, the brake control device 116, and the steering control device 117 are connected to the driving assistance apparatus 300, and the like via the on-vehicle network to be able to communicate therewith.

The drive control device 115 inputs a detection value acquired by an accelerator pedal sensor (not shown), and controls the driving states of the engine and the like according to the input detection value. The drive control device 115 is also able to control the driving state of the engine by the degree of control of driving force, calculated by the driving assistance apparatus 300 based on driving assistance.

The brake control device 116 inputs a detection value acquired by a brake pedal sensor (not shown), and controls the operating state of a brake according to the input detection value. The brake control device 116 is also able to control the operating state of the brake by the degree of control of the brake, calculated by the driving assistance apparatus 300 based on driving assistance.

The steering control device 117 inputs a detection value acquired by a steering angle sensor (not shown), and controls the steering angle of the steering wheel according to the input detection value. The steering control device 117 is also able to control the steering angle of the steering wheel by the degree of control of the steering angle, calculated by the driving assistance apparatus 300 based on driving assistance.

For instance, in the host vehicle 10, a signal for speed adjustment is input to the display device 113 from the driving assistance apparatus 300, thereby making it possible to display on the display device 113 an instruction about the acceleration/deceleration of the host vehicle 10. This signal is input to the drive control device 115, thereby enabling the drive control device 115 to finely adjust the speed of the host vehicle 10. Additionally, for instance, in the host vehicle 10, a signal for brake adjustment is input to the display device 113 from the driving assistance apparatus 300, thereby making it possible to display on the display device 113 an instruction about the braking operation of the host vehicle 10. This signal is input to the brake control device 116, thereby enabling the brake control device 116 to decrease the speed of the host vehicle 10. Additionally, for instance, in the host vehicle 10, a signal for the adjustment of the degree of steering is input to the display device 113 from the driving assistance apparatus 300, thereby making it possible to display on the display device 113 an instruction about the degree of steering of the host vehicle 10. This signal is input to the steering control device 117, thereby enabling the steering control device 117 to finely adjust the steering angle of the host vehicle 10.

The driving assistance apparatus 300 receives input of signals relating to driving assistance, from the GPS device 101, the on-vehicle camera 102, the millimeter wave radar 103, and other devices. Based on input signals relating to driving assistance, the driving assistance apparatus 300 also performs driving assistance relating to following assistance, such as deceleration/acceleration and steering. Signals relating to driving assistance include, for example, setting relating to following assistance such as setting execution of following assistance, which is input by the driver. The driving assistance apparatus 300 outputs, for example human machine interface (HMI) information, drive control information, brake control information, and steering control information.

The driving assistance apparatus 300 includes a microcomputer, which is an electronic control unit (ECU) and has an arithmetic section and a storage section. The arithmetic section performs arithmetic processing of a control program as of a CPU. The storage section includes a read-only memory (ROM) in which control programs, data, and the like are stored, and a volatile memory (RAM) in which an arithmetic result acquired by the arithmetic section is temporarily stored. The storage section also includes nonvolatile storage media, such as a hard disk and flash memory (EEPROM), which are able to hold large amounts of data. Accordingly, the driving assistance apparatus 300 can provide the function of driving assistance by reading, in the arithmetic section, programs and various parameters for driving assistance held in the storage section and by performing processing for execution.

In the present embodiment, the storage section of the driving assistance apparatus 300 stores a first traveling track acquiring program for determining a traveling track (first traveling track) along which a vehicle (first vehicle) can travel based on a lane division line; and a second traveling track acquiring program for determining a traveling track (second traveling track) along which the vehicle can travel along the traveling track of a preceding vehicle (second vehicle). The storage section also stores a deviation information management program for managing a separation distance between a traveling track determined based on a lane division line and a traveling track determined based on a preceding vehicle, as deviation information according to a traveling position. Additionally, the storage section stores a target track formation program for selecting a traveling track to be used in steering assistance, from either a traveling track based on a lane division line or a traveling track of a preceding vehicle, and then forming, based on the selected traveling track, a target track that the vehicle is caused to follow. Also, the storage section stores a steering assistance program for calculating the degree of steering required to cause the vehicle to follow the target track.

The driving assistance apparatus 300 includes a first traveling track acquiring section 310 that acquires a target track for lane keeping control by performing a first traveling track acquiring program, thereby determining a traveling track by which the vehicle can be caused to travel along a lane. The driving assistance apparatus 300 includes a second traveling track acquiring section 320 that acquires a target track for the control of following a preceding vehicle by performing a second traveling track acquiring program, thereby determining a traveling track along which the vehicle can be caused to travel based on the traveling track of the preceding vehicle. Furthermore, the driving assistance apparatus 300 includes, as a deviation information storage section, a deviation information processing section 330 that performs a deviation information recording program, thereby storing, in the traveling track database 122, deviation information, which is information about deviation between the first traveling track determined by the first traveling track acquiring section 310 and the second traveling track determined by the second traveling track acquiring section 320. The driving assistance apparatus 300 also includes a target track forming section 340 that forms, in response to the execution of the target track formation program, a target track that the vehicle is caused to follow based on either the first traveling track or the second traveling track. Furthermore, the driving assistance apparatus 300 includes a steering assistance section 350 that calculates the degree of steering assistance by performing a steering assistance program.

Based on a picked up image input from the on-vehicle camera 102, the first traveling track acquiring section 310 determines a traveling track based on a lane division line. The first traveling track acquiring section 310 includes: a division line detecting section 311 that detects a lane division line by processing a picked up image; a first traveling track determining section 312 that determines a traveling track based on a detected lane division line; and a first traveling track managing section 313 that manages, for example, the storage of the determined traveling track.

The division line detecting section 311 retrieves a lane division line marked on a road surface by processing a picked up image of a scene ahead of the vehicle, which has been input from the on-vehicle camera 102, and this section also detects the position of the retrieved lane division line relative to the host vehicle 10. A division line detecting section 311 detects a portion having a big luminance change on a road surface, and detects a lane division line based on, for example, the determination of continuity of the detected portion. The division line detecting section 311 detects lane division lines on the left and right sides of the host vehicle 10, and also detects the respective items of lane division line information in the detected left and right lane division lines. Examples of lane division line information include the curvature of a lane division line, the space (lateral deviation) between a lane division line and a vehicle, and the angle (yaw angle) that is a relative deviation between the extending direction of a lane division line and a vehicle. The space (lateral deviation) between a lane division line and the host vehicle 10 may be a distance from a side of the vehicle or a distance from the middle of the vehicle width. The division line detecting section 311 may also detect the line type, length, or thickness of each of the left and right lane division lines, or may detect the distance between the recognized left and right lane division lines as well.

The division line detecting section 311 may not be able to recognize a lane division line on a road surface due to discontinuity or fading of the lane division line, the color of the road surface, reflection from the road surface, and the like.

Based on the lane division line detected by the division line detecting section 311, the first traveling track determining section 312 recognizes a lane in which the host vehicle is traveling, and also determines a first traveling track as a traveling track in this lane. Among the lane division lines detected on the left and right sides of the host vehicle 10, the first traveling track determining section 312 determines the lane division lines closest to the vehicle on the left and right sides thereof, and recognizes the space between the determined left and right lane division lines, as the lane in which the host vehicle 10 is traveling. The first traveling track determining section 312 detects the center position of the recognized lane, and determines, as a first traveling track, the center track extending along the lane.

The first traveling track managing section 313 stores the determined first traveling track in the traveling track database 122 together with position information and the like. Additionally, the first traveling track managing section 313 is able to retrieve the first traveling track stored in the traveling track database 122 if required.

The second traveling track acquiring section 320 determines, as a second traveling track, the traveling track of a preceding vehicle determined based on a picked up image input from the on-vehicle camera 102 and based on detection information input from a millimeter wave radar 103. The second traveling track acquiring section 320 includes: a preceding vehicle detecting section 321 that detects a preceding vehicle ahead of the vehicle; a second traveling track determining section 322 that determines a traveling track based on the detected preceding vehicle; and a second traveling track managing section 323 that manages, for example, storage of the determined second traveling track.

The preceding vehicle detecting section 321 determines a preceding vehicle based on a picked up image input from the on-vehicle camera 102 and based on detection information input from the millimeter wave radar 103. The preceding vehicle detecting section 321 determines whether an object detected from a picked up image and detection information is a preceding vehicle or not, based on, for example, the shape, relative position, or relative speed of the object. The preceding vehicle detecting section 321 may detect each of a plurality of preceding vehicles. The preceding vehicle detecting section 321 can identify a preceding vehicle from either a picked up image or detection information.

The second traveling track determining section 322 determines, as a second traveling track, the traveling track along which the determined preceding vehicle is traveling. Using, for example, the center of the determined preceding vehicle 20 in the direction of the vehicle width as a reference, the second traveling track determining section 322 determines a second traveling track. The second traveling track thus determined is a traveling track along which a following vehicle can travel. When a plurality of preceding vehicles 20 are identified, the second traveling track determining section 322 determines second traveling tracks corresponding to the preceding vehicles.

The second traveling track managing section 323 stores the determined first traveling track into the traveling track database 122 together with position information and the like. Additionally, the second traveling track managing section 323 is able to acquire the second traveling track stored in the traveling track database 122 if required.

The deviation information processing section 330 includes: an offset calculating section 331 that calculates the separation distance (offset) between a first traveling track and a second traveling track, and an offset managing section 332 that stores the calculated separation distance to associate this separation distance with a correspondence position, which is a corresponding position on the second traveling track.

The offset calculating section 331 calculates the separation distance between a first traveling track and a second traveling track, based on, for instance, the first traveling track as reference. Specifically, the distance from a specific position as a traveling position where the host vehicle 10 on the first traveling track travels to the correspondence position where a perpendicular line from the specific position intersects is calculated as a separation distance (offset). For instance, by indicating the right side and the left side with respect to the advancing direction of the host vehicle 10 as "positive" and "negative," respectively, a separation distance can be indicated together with either the left or right side from which separation takes place in the advancing direction of the host vehicle 10. Additionally, the specific position on the first traveling track is the position of the host vehicle 10 a predetermined distance ahead in the advancing direction of the host vehicle 10. However the specific position may be the current position of the host vehicle 10. Therefore, the offset calculating section 331 cannot calculate a separation distance for a position in which a first or second traveling track has not been detected. When a separation distance cannot be calculated as described above, a large value that cannot generally be calculated may be calculated as a separation distance, in order to indicate that it cannot be calculated.

When a first traveling track and a second traveling track are detected, the offset calculating section 331 calculates a separation distance at every predetermined period or every predetermined distance. Accordingly, even if a separation distance is not temporarily detected, the calculation of a separation distance is resumed when a first traveling track and a second traveling track are both detected again.

The offset managing section 332 associates a separation distance, calculated by the offset calculating section 331, with a correspondence position on a second traveling track, and stores in the traveling track database 122 the separation distance associated with the correspondence position. The correspondence position on the second traveling track means the position corresponding to the specific position on the first traveling track. Additionally, based on a specific position on a first traveling track and a correspondence position on a second traveling track, the offset managing section 332 is able to acquire a separation distance stored in the traveling track database 122 as required.

The target track forming section 340 forms, in response to the execution of the target track formation program, a target track that the vehicle is caused to follow based on either the first traveling track or the second traveling track. When the first traveling track has been detected, the target track forming section 340 selects this first traveling track detected and forms a target track. At this time, the target track to be formed is identical to, for instance, the first traveling track.

If detection of a first traveling track is discontinued, the target track forming section 340 selects a second traveling track that has a correspondence position, which corresponds to a specific position from which the first traveling track is discontinued. Based on the selected second traveling track, the target track forming section 340 forms a target track based on the second traveling track extending forward from the correspondence position. At this time, even when the second traveling track is detected based on a preceding vehicle traveling on the same lane as the first traveling track, there is usually some deviation between the first and second traveling tracks. Therefore, the target track thus formed may include a discontinuous portion (i.e., a portion where deviation has occurred) due to deviation between the first and second traveling tracks, resulting from switching from the first traveling track to the second traveling track. A discontinuous portion that has thus occurred may be reflected in steering assistance for a vehicle, making the vehicle movement noticeable, with a result that the driver may experience discomfort.

Therefore, in the present embodiment, the target track forming section 340 acquires from the traveling track database 122 the separation distance between a specific position corresponding to the position where a first traveling track is discontinued and a correspondence position on a second traveling track, which corresponds to the specific position, and corrects the second traveling track based on the acquired separation distance, thereby forming a target track. If the position where the first traveling track is discontinued and the specific position do not match, the target track forming section 340 may acquire the separation distance corresponding to a specific position closest to the position where the first traveling track is discontinued. When a traveling track used for forming a target track is switched from a first traveling track to a second traveling track, the target track forming section 340 forms a target track based on the second traveling track and a separation distance to decrease deviation from the target track formed based on the first traveling track. After that, a target track is formed based on the separation distance acquired when switching takes place from the first traveling track to the second traveling track, and based on the second traveling track successively advancing.

Additionally, in response to the detection of the first traveling track, the target track forming section 340 switches the traveling track, on the basis of which the target track is formed, from the second traveling track to the first traveling track. Thus, the target track is switched from the track formed based on the second traveling track and the separation distance to the track formed based on the first traveling track. In the present embodiment, when a first traveling track is detected during the formation of a traveling track based on a second traveling track, the target track forming section 340 acquires the separation distance between the first and second traveling tracks from the traveling track database 122. If there is a difference between a separation distance used for adjusting a second traveling track and a separation distance newly acquired, the target track forming section 340 forms a target track based on the second traveling track while making an adjustment to decrease the difference. Additionally, after the target track forming section 340 eliminates the deviation between a target track and a first traveling track or decreases the deviation to such a degree that the driver does not experience discomfort, the section 340 switches the track used for forming the target track, from the second traveling track to the first traveling track.

Thus, the target track forming section 340 forms a target track by using a first traveling track as a priority and a second traveling track as an auxiliary. Thus, the target track is arranged at the center of the lane as much as possible. Thus, driving assistance in which the host vehicle 10 is traveling at the center of the lane is provided.

Furthermore, by performing the steering assistance program, the steering assistance section 350 calculates the degree of steering assistance, which is the degree of steering for steering assistance. The degree of steering assistance may by an auxiliary force (assist torque) applied to the steering wheel to assist steering, or may be steering force applied to the steering wheel to carry out steering. The degree of steering assistance, calculated by the steering assistance section 350, is output to the steering control device 117. If the input degree of steering assistance is an auxiliary force, the steering control device 117 applies assist torque corresponding to the steering, thereby assisting the driver's steering operation. Meanwhile, if the input degree of steering assistance is a steering force, the steering control device 117 applies driving torque corresponding to the steering, thereby assisting driving such that the host vehicle 10 is automatically steered.

Figure 2:
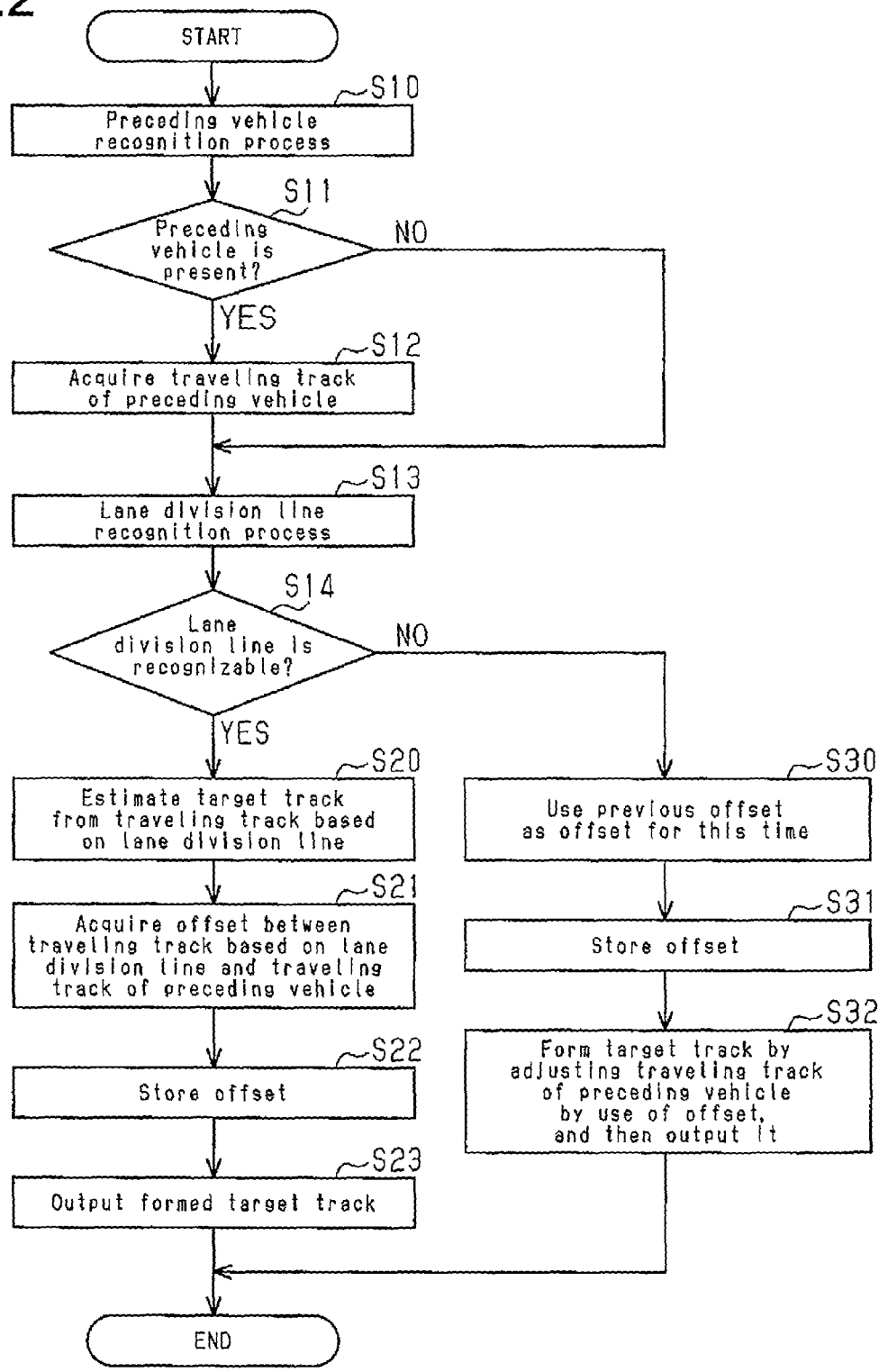
FIG. 2 is a flowchart illustrating driving assistance process in the driving assistance apparatus in FIG. 1.

Next, a target track formation process for forming a target track for following assistance will be described with reference to FIG. 2. When an instruction is given to carry out following assistance, through setting by the driver, the driving assistance apparatus 300 performs the target track formation process periodically or at predetermined intervals as required. For the illustrative purposes, a description will be given of the case where a preceding vehicle is only one.

When the target track formation process is initiated, the driving assistance apparatus 300 performs a preceding vehicle recognition process (step S10). In the preceding vehicle recognition process, a preceding vehicle present ahead in the advancing direction of the host vehicle 10 is detected from, for instance, an image picked up by the on-vehicle camera 102 or the result of detection by the millimeter wave radar 103. The driving assistance apparatus 300 determines whether there is a preceding vehicle ahead in the advancing direction of the host vehicle 10 (step 11). If the determination is made that there is a preceding vehicle ahead in the advancing direction of the host vehicle 10 (YES in step S11), the driving assistance apparatus 300 acquires the traveling track of the preceding vehicle as a second traveling track (step S12). The second traveling track is acquired based on the traveling position of the preceding vehicle, which is acquired at every predetermined period. Whether the preceding vehicle detected previously and the preceding vehicle detected this time are identical or not is determined by, for instance, a tracking process for a preceding vehicle. The tracking process may be performed, for example, based on the specific ID of a vehicle or of a device mounted in the vehicle, based on the number on the number plate of the vehicle or the features or the like of the vehicle, acquired by image recognition, or based on continuity between the previous detected position and the current detected position.

If the second traveling track is acquired in step S12 or if the determination is made that there is no preceding vehicle ahead in the advancing direction of the host vehicle 10 (NO in step S11), the driving assistance apparatus 300 performs a process for the recognition of a lane division line (step S13). In the process of the recognition of a lane division line, a pair of lane division lines, which are present ahead in the advancing direction of the host vehicle 10 and on the left and right sides thereof, are detected from, for example, an image picked up by the on-vehicle camera 102. The driving assistance apparatus 300 determines whether lane division lines have been recognized or not (step S14). If the determination is made that lane division lines have been recognized (YES in step S14), the driving assistance apparatus 300 calculates (estimates) a traveling track based on the recognized lane division lines (step S20). Specifically, based on the lane division lines on the left and right sides of the host vehicle 10, the driving assistance apparatus 300 determines, as a first traveling track, the traveling track of the host vehicle 10, which is intermediate between the left and right lane division lines. From the first traveling track thus determined, a target track that the host vehicle 10 is caused to follow is formed (estimated).

The driving assistance apparatus 300 calculates (acquires) the separation distance (offset) between the first traveling track and the second traveling track (step S21), and also stores the acquired separation distance into the traveling track database 122 in correspondence with the traveling positions (step S22). The separation distance is stored to be associated with a correspondence position on the second traveling track, which is the position corresponding to the specific position on the first traveling track, used for the calculation of the separation distance.

The driving assistance apparatus 300 outputs the thus formed target track to the steering assistance section 350 (step S23). The target track formation process is terminated.

In contrast, if the determination is made that no lane division lines are recognized (NO in step S14), the driving assistance apparatus 300 sets a separation distance (offset) associated with the second traveling track as a separation distance associated with the previous traveling track (step S30). The driving assistance apparatus 300 stores the thus set separation distance into the traveling track database 122 in correspondence with a position on the second traveling track (step S31). The separation distance is stored in correspondence with the position at which the second traveling track is detected or a position detected at every predetermined interval. The driving assistance apparatus 300 forms a target track based on the second traveling track consisting of the traveling track of the preceding vehicle 20 and based on the most recent separation distance, and then outputs the formed target track to the steering assistance section 350 (step S32). The target track formation process is terminated.

Operation of the driving assistance apparatus 300 of the present embodiment will now be described with reference to FIGS. 3 to 5.

Figure 3:
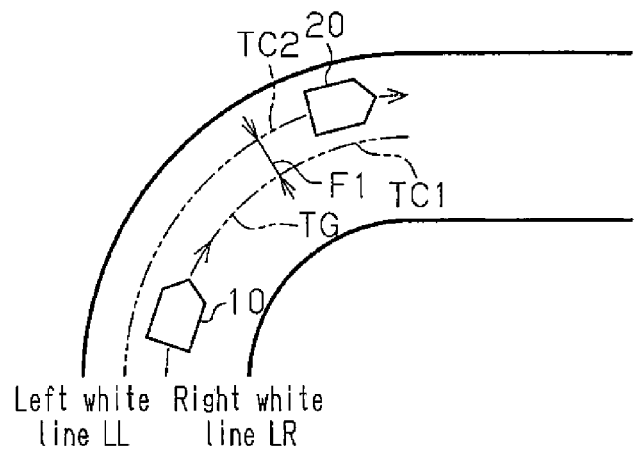
FIG. 3 is a schematic view illustrating a mode in which the driving assistance apparatus in FIG. 1 causes a vehicle to follow along the lane division lines.

As shown in FIG. 3, the host vehicle 10 is traveling in a lane sectioned off by a left white line LL and a right white line LR, which are lane division lines. Additionally, a preceding vehicle 20 is traveling in this lane and ahead in the advancing direction of the host vehicle 10.

In the host vehicle 10, driving assistance relating to lane keeping is performed. Therefore, in the host vehicle 10, a target track TG for the host vehicle 10 to follow has been formed by a traveling track formation process based on lanes.

The host vehicle 10 detects the left white line LL and the right white line LR based on the recognition of an image of a scene ahead in the advancing direction thereof picked up by the on-vehicle camera 102, and recognizes the area between the detected left white line LL and the right white line LR as the lane in which the host vehicle 10 is traveling. Additionally, the host vehicle 10 calculates, as a first traveling track TC1, a track along which the center of the recognized lane in the widthwise direction thereof is extended along the lane, that is, the track consisting of the intermediate points between the left and right white lines LL and LR. In the host vehicle 10, the target track TG is formed based on the first traveling track TC1 thus calculated. In the present embodiment, it is generally preferable for the host vehicle 10 to travel at the center of the lane. Therefore, a target track TG to be formed is identical to the first traveling track TC. Therefore, if it is preferable that the target track TG deviate from the center of the lane by a given distance in the widthwise direction thereof, the target track TG may deviate from the first traveling track TC1 by this given distance in the widthwise direction.

Also, based on the process of an image of a scene ahead in the advancing direction of the host vehicle 10, which has been picked up by the on-vehicle camera 102, and based on the result of detection by the millimeter wave radar 103, the host vehicle 10 acquires a second traveling track TC2, which is the track along which the preceding vehicle 20 has traveled.

Additionally, the host vehicle 10 according to the present embodiment calculates the separation distance (offset) F1 between the first traveling track TC1 and the second traveling track TC2. The separation distance F1 is calculated as the distance from a specific position that is the position ahead of the vehicle on the first traveling track TC1 and determined to calculate the separation distance F1, to a correspondence position on the second traveling track, which corresponds to the specific position. Specifically, the correspondence position on the second traveling track TC2 is the position where a perpendicular line from the specific position on the first traveling track TC1 intersects the second traveling track TC2. Also, the correspondence position on the second traveling track TC2 may be the position closest to the specific position on the first traveling track. The separation distance F1 thus calculated is stored in the traveling track database 122 in the mode in which the distance F1 is associated with a correspondence position on the second traveling track TC2.

Figure 4:
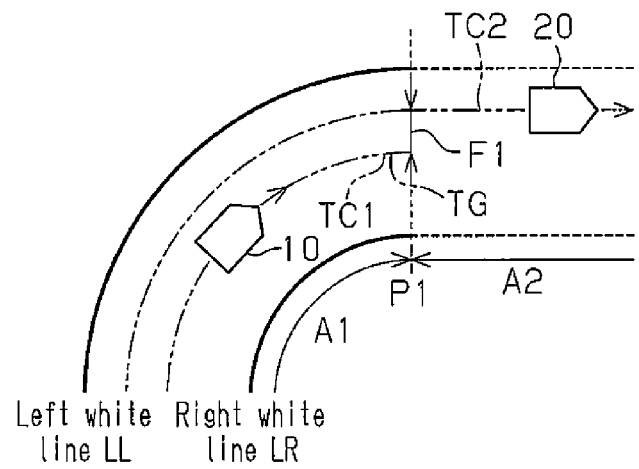
FIG. 4 is a schematic view illustrating a mode in which the driving assistance apparatus in FIG. 1 cannot recognize a lane division line.

For instance, as shown in FIG. 4, it is assumed that the host vehicle 10 is traveling in a section A1 in the mode in which the vehicle 10 follows the target track TG formed based on the first traveling track TC1. If a lane division line discontinuing position P1, where the left and right white lines LL and LR can no longer be recognized, is present ahead in the advancing direction of the host vehicle 10, the host vehicle 10 cannot calculate, based on a lane division line, the first traveling track TC1 for a section A2 that is ahead of the lane division line discontinuing position P1. Meanwhile, even beyond the lane division line discontinuing position P1, the host vehicle 10 is able to continue detection of the preceding vehicle 20 traveling ahead in the advancing direction of the host vehicle 10. That is, in the section A2 beyond the lane division line discontinuing position P1, the host vehicle 10 is able to acquire a second traveling track TC2, which is the traveling track of the preceding vehicle 20.

In the section A1, in which the first and second traveling tracks TC1 and TC2 can be acquired, before the lane division line discontinuing position P1, the host vehicle 10 is able to calculate the separation distance F1 between the first and second traveling tracks TC1 and TC2. The separation distance F1 is stored into the traveling track database 122 to be associated with a correspondence position on the second traveling track TC2. Meanwhile, in the section A1, which is ahead of the lane division line discontinuing position P1, the first traveling track TC1 cannot be acquired and, therefore, the separation distance F1 cannot be calculated either. The host vehicle 10, therefore, stores the traveling track database 122 in the separation distance F1 extending until the specific position on the first traveling track TC1 reaches the lane division line discontinuing position P1. As a result, the specific position on the first traveling track TC1, corresponding to the lane division line discontinuing position P1, is the forefront position in which the separation distance F1 can be acquired on the first traveling track TC1. Therefore, after the host vehicle 10 passes the lane division line discontinuing position P1, the separation distance F1 at this specific position is the most recent, or the last separation distance F1. Additionally, in the section A2 beyond the lane division line discontinuing position P1 in which the first traveling track TC1 cannot be acquired, a target track TG cannot be formed based on the first traveling track TC1.

Figure 5:
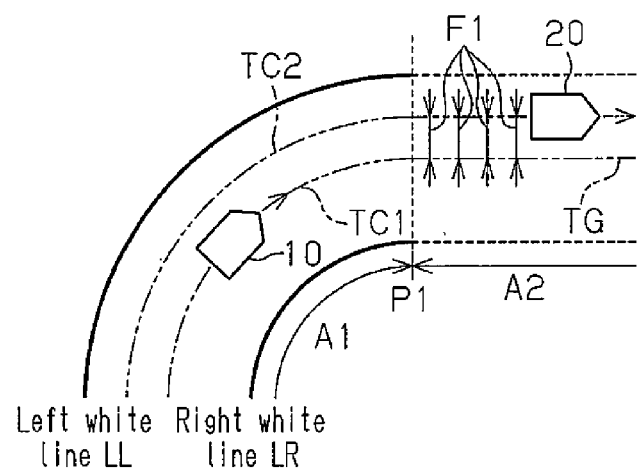
FIG. 5 is a schematic view illustrating a mode in which the driving assistance apparatus in FIG. 1 forms a target track based on the traveling track of a preceding vehicle.

Therefore, as shown in FIG. 5, in the section A2, which is ahead of the lane division line discontinuing position P1, the host vehicle 10 forms a target track TG based on the detected second traveling track TC2 of the preceding vehicle 20, instead of the first traveling track, which is based on the lane division line that cannot be detected. Specifically, the separation distance F1 corresponding to the lane division line discontinuing position P1 is determined, and calculation, such as subtracting the determined separation distance F1 from the second traveling track TC2 in the section A2 beyond the lane division line discontinuing position P1, is carried out, thereby forming a target track TG based on the second traveling track TC2. Thus, the target track TG formed based on the first traveling track TC1 and the target track TG formed based on the second traveling track TC2 are formed in the mode in which they are continuous at the lane division line discontinuing position P1, that is, deviation between them is reduced. Additionally, in the section A2, at every formation time of a target track TG, calculation, such as subtracting the last separation distance F1 from the second traveling track TC2, is carried out to thereby form the target track TG. Thus, even when the traveling track based on which the target track TG is formed is switched from the first traveling track TC1 to the second traveling track TC2, deviation of the target track TG before and after the lane division line discontinuing position P1, specifically, lateral deviation with respect to the advancing direction, is reduced, thus maintaining continuity. In the host vehicle 10, steering assistance is carried out based on the target track TG, the continuity of which is thus maintained. Accordingly, lateral movement of the vehicle is prevented from being increased. That is, in the driving assistance apparatus 300 according to the present embodiment, discomfort of the driver is reduced even when the traveling track based on which the target track TG is formed is switched from the first traveling track TC1 to the second traveling track TC2.

As described above, the driving assistance apparatus 300 of the present embodiment achieves the following advantages.

(1) When the base for the formation of a target track that the host vehicle 10 is caused to follow is switched between the first traveling track TC1 and the second traveling track TC2, the target track TG is formed to decrease deviation between the first traveling track TC1 and the second traveling track TC2 based on a separation distance F1 included in deviation information. Therefore, even when the base for the formation of a target track that the host vehicle 10 is caused to follow is switched between the first traveling track TC1 and the second traveling track TC2, significant deviation of the target track TG before and after switching is restricted. Accordingly, significant change in driving assistance carried out based on the target track TG is restricted. Thus, even when the target that the host vehicle 10 follows is switched between a lane division line and a preceding vehicle 20, this driving assistance apparatus can reduce driver discomfort resulting from the switching.

(2) By determining a first traveling track TC1 by use of a white or yellow lane division line that appropriately indicates a traveling position, an appropriate target track TG is formed. Additionally, lane division lines meet standards that ensure a high possibility of appropriate recognition.

(3) Deviation of the target track TG formed based on the first traveling track TC1 and the second traveling track TC2 is decreased based on a separation distance F1. Accordingly, even when the traveling track is switched, deviation of the target track is decreased, and a significant change in the degree of steering is restricted, thus reducing discomfort caused to the driver.

(4) Even when a first traveling track TC1 cannot be detected temporarily or continuously, making it impossible to continue the acquisition of the separation distance F1, the target track TG based on the second traveling track TC2 can be formed using the immediately previous separation distance F1.

(5) Even when the target track TG cannot be formed based on the first traveling track TC1, the target track TG can be formed based on the second traveling track TC2. Accordingly, the driving assistance is continued.

(6) When the target track TG is formed based on the second traveling track TC2, the separation distance F1 is used, thereby suppressing the occurrence of deviation of the target track TG.

(7) Even when the target track TG is being formed from the second traveling track TC2, the first traveling track TC1 suitable as the base for the formation of a target track is detected. Therefore, the target track TG is formed based on the first traveling track TC1. Thus, the target track is appropriately calculated.

(8) The target track TG is based on the separation distance F1 stored after the resumption of storing. Therefore, even when the target track TG is changed from a track formed based on the second traveling track TC2 to a track formed based on the first traveling track TC1, driver discomfort is reduced.

Second Embodiment

A driving assistance apparatus according to a second embodiment will now be described with reference to FIGS. 6 to 8.

In the first embodiment, when a target track is formed based on a second traveling track, the target track is formed based on the second traveling track of one preceding vehicle. In contrast, in the second embodiment, a target track is formed based on the respective second traveling tracks of two preceding vehicles, which differs from the first embodiment. However, the second embodiment is identical to the first embodiment in configuration except for this difference. Therefore, in the description below, configurations different from those in the first embodiment will be described in detail. The configurations identical to those in the first embodiment are labeled with the symbols identical to those in the first embodiment, and the detailed explanations thereof will be omitted for the illustrative purposes.

With reference to FIGS. 6 to 8, the driving assistance apparatus of the present embodiment will be described.

As shown in FIG. 6, the host vehicle 10 is traveling in a lane sectioned off by a left white line LL1 and a right white line LR1, which are lane division lines. Additionally, the road on which the host vehicle 10 is traveling has a second left white line LL2 on the left side of and outside the first left white line LL1, and a second right white line LR2 on the right side of and outside the first right white line LR1. That is, the host vehicle 10 is traveling on a road that has, on the left and right sides thereof, lanes adjacent to the lane in which the host vehicle is traveling; for example, in the middle lane of three lanes.

Additionally, ahead of the host vehicle 10 in the advancing direction thereof are a left preceding vehicle 21 traveling in the lane on the left side of the lane in which the host vehicle 10 is traveling, and a right preceding vehicle 22 traveling in the lane on the right side of the lane in which the host vehicle 10 is traveling.

In the vehicle 10, driving assistance relating to lane keeping is performed. Therefore, in the host vehicle 10, a target track TG2 to be followed by the host vehicle 10 is formed by a formation process for a traveling track based on lanes.

The host vehicle 10 recognizes the area between the first left white line LL1 and first right white line LR1 as the lane in which the host vehicle 10 is traveling, which has been detected based on the recognition of an image of a scene ahead in the advancing direction thereof, picked up by an on-vehicle camera 102. Additionally, the host vehicle 10 calculates a first traveling track TC12 extending along the direction of the lane in the center of the widthwise direction of the lane. In the host vehicle 10, the target track TG2 is formed based on the first traveling track TC12 thus calculated. Additionally, the host vehicle 10 may detect the second left white line LL2 on the left side of and outside the first left white line LL1, and the second right white line LR2 on the right side of and outside the first right white line LR1.

Also, based on the processing of an image of a scene ahead in the advancing direction of the host vehicle 10, which has been picked up by the on-vehicle camera 102, and based on the result of detection by a millimeter wave radar 103, the host vehicle 10 acquires a left traveling track TC22 as a second traveling track, which is the track along which the left preceding vehicle 21 has traveled, and a right traveling track TC23 as another second traveling track, which is the track along which the right preceding vehicle 22 has traveled.

Additionally, the host vehicle 10 according to the present embodiment calculates a separation distance (offset) F11 between the first traveling track TC1 and the left traveling track TC22, and a separation distance (offset) F12 between the first traveling track TC1 and the right traveling track TC23. The separation distances F11, F12 are calculated as distances between a position on the first traveling track TC12 and the left traveling track TC22 and the right traveling track TC23, respectively, ahead in the advancing direction of the host vehicle 10. For instance, each of the distances of the left and right traveling tracks TC22, TC23 is a distance from a specific position on the first traveling track TC12 to the position where a perpendicular line from this specific position intersects the traveling tracks TC22, TC23. The separation distances F11, F12 thus calculated are stored in a traveling track database 122 in the mode in which the distances F11, F12 are associated with correspondence positions on the left traveling track TC22 and the right traveling track TC23, respectively.

As shown in FIG. 7, the host vehicle 10 is traveling in a section A11 in the mode in which the vehicle 10 follows the target track TG2 formed based on the first traveling track TC12. The host vehicle 10 cannot calculate, based on a lane division line, the first traveling track TC12 for a section A21 that is ahead of a lane division line discontinuing position P2, from which the left and right white lines LL1 and LR1 can no longer be recognized. Meanwhile, even beyond the lane division line discontinuing position P2, the host vehicle 10 is able to continue detection of the left preceding vehicle 21 and the right preceding vehicle 22 traveling ahead in the advancing direction of the host vehicle 10. That is, in the section A21 beyond the lane division line discontinuing position P2, the host vehicle 10 is able to retrieve the left traveling track TC22 of the left preceding vehicle 21 and the right traveling track TC23 of the right preceding vehicle 22.

For the section A21, which is ahead of the lane division line discontinuing position P2, the host vehicle 10 forms a target track TG 2 based on the detected left traveling track TC22 of the left preceding vehicle 21 and the detected right traveling track TC23 of the right preceding vehicle 22, instead of the first traveling track TC12, which is based on a lane division line that can no longer be detected.

To be specific, with reference to FIG. 8, the host vehicle 10 first determines the separation distances F11, F12 corresponding to the lane division line discontinuing position P2. Subsequently, the host vehicle 10 forms the left target track TC22 and the right target track TG 23 corresponding to the second traveling tracks by carrying out calculation, such as subtracting the determined separation distances F11, F12 from the left traveling track TC22 and the right traveling track TC23, respectively, in the section A21 beyond the lane division line discontinuing position P2. Furthermore, the left target track TG 22 and the right target track TG23 are averaged to form the target track TG2. For example, by averaging the left and right target tracks TG22, TG23, the target track TG2 is formed as a track passing through the intermediate space between the left and right target tracks TG22, TG23.

Thus, the target track TG2 is formed in the mode in which the target track TG2 is continuous at the lane division line discontinuing position P2, which is the boundary between the portion formed based on the first traveling track TC12 and the portion based on the left and right traveling tracks TC22, TC23, that is, in the mode in which deviation is reduced. Additionally, in the section A21, every formation time of a target track TG2, the left and right target tracks TG22, TG23 formed based on the separation distances F11, F12, corresponding to the left and right traveling tracks TC22, TC23 respectively, are averaged to thereby form the target track TG2. Thus, even when the traveling track based on which the target track TG2 is formed is switched from the first traveling track TC12 to the left and right traveling tracks TC22, TC23, deviation of the target track TG2 before and after the lane division line discontinuing position P2, specifically, lateral deviation with respect to the advancing direction, is reduced, thus maintaining continuity. In the host vehicle 10, steering assistance is carried out based on the target track TG2, the continuity of which is thus maintained. Accordingly, in the steering assistance, lateral movement of the vehicle 10 is prevented from being increased. That is, in the driving assistance apparatus 300 according to the present embodiment, driver discomfort is reduced even when the traveling track based on which the target track TG2 is formed is switched from the first traveling track TC12 to the left and right traveling tracks TC22,TC23.

As described above, the driving assistance apparatus of the present embodiment achieves the following advantage in addition to the advantages (1) to (8) of the first embodiment.

(9) A target track TG2 is formed based on the average of a plurality of traveling tracks, namely, the left and right traveling tracks TC22, TC23, respectively, which are second traveling tracks. The target track TG2 thus formed is more stabilized.

Other Embodiments

The above illustrated embodiments may be modified as follows.

In each embodiment described above, an example is given where the on-vehicle network is CAN. However, the on-vehicle network may be other networks such as Ethernet (R), FlexRay (R), or IEEE1394 (FireWire (R)). Alternatively, the on-vehicle network may be a combination of CAN and such a network. Thus, the flexibility in configuration of a vehicle in which the driving assistance apparatus is used is improved.

In each embodiment described above, an example is given where the driving assistance apparatus 300 is composed of a single ECU. However, the on-vehicle control device may exhibit its function by the cooperation of a plurality of ECUs. Thus, the flexibility in design of a driving assistance apparatus is improved.

In each embodiment described above, an example is given where the storage device 120 is provided outside the driving assistance apparatus 300. However, as long as data can be read or written by a driving assistance apparatus, part of or the entire storage device may be included in the driving assistance apparatus. Thus, the flexibility in configuration of the driving assistance apparatus is improved.

In each embodiment described above, an example is given where the GPS device 101, the on-vehicle camera 102, the millimeter wave radar 103, the navigation system 112, the display device 113, and the driving assistance apparatus 300 are separately provided. However, a GPS device, an on-vehicle camera, a millimeter wave radar, a navigation system, a display device, and a driving assistance apparatus may be configured such that all of or some of their functions are grouped together, or such that some of the functions are shared. Thus, the flexibility in configuration of the driving assistance apparatus is improved.

In each embodiment described above, an example is given where the GPS device 101, the on-vehicle camera 102, the millimeter wave radar 103, the navigation system 112, and the display device 113 are provided. However, depending on the configuration of the host vehicle, a GPS device and a navigation system do not have to be provided. If a vehicle automatically steers, a display device does not have to be provided. If a preceding vehicle is detected by image processing, a millimeter wave radar need not be provided. Thus, the flexibility in configuration of the driving assistance apparatus is improved.

In each embodiment described above, an example is given where the GPS device 101, the on-vehicle camera 102, the millimeter wave radar 103, the navigation system 112, the display device 113, and the driving assistance apparatus 300 are provided on the host vehicle 10. However, part of or the entire function of a driving assistance apparatus or the like may be provided in a portable information processor or the like, such as a mobile phone or smart phone, as long as such a driving assistance apparatus and such an information processor are connected to be able to mutually transmit/receive information. Thus, the flexibility in the design of the driving assistance apparatus is extended.

In each embodiment described above, an example is given where the drive control device 115 controls the driving state of the engine. However, if the vehicle is an electric vehicle or hybrid vehicle, a drive control device may control the driving state of a drive motor. For example, in a hybrid vehicle, the driving state may be controlled such that drive force is properly distributed to the engine and the drive motor. Thus, the range of application of the driving assistance apparatus is widened.

In each embodiment described above, an example is given where the brake control device 116 controls the operating state of the brake. However, if the vehicle is an electric vehicle or hybrid vehicle, a brake control device may control a regeneration brake. For example, in a hybrid vehicle, a braking state may be controlled such that braking force is properly distributed to the brake and the drive motor. Thus, the range of application of the driving assistance apparatus is widened.

In each embodiment described above, an example is given where, when the traveling track for target track formation is changed from the second traveling track to the first traveling track, the target track is formed based on the second traveling track to decrease deviation between the separation track used for the adjustment of the second traveling track and the separation distance newly acquired. However, as long as such a portion so discontinuous as to cause discomfort to the driver does not occur in the target track, the deviation of the target track may be resolved by, for example, a gradual change when the traveling track for the target track formation is changed from the second traveling track to the first traveling track. Thus, the range of application of the driving assistance apparatus is widened.

In the second embodiment described above, an example is given where the target track TG2 is formed by averaging the left and right target tracks TG22, TG23. However, as long as one target track can be formed from a plurality of target tracks, the target track may be formed by processing other than averaging the plurality of target tracks. Thus, the flexibility in design of the driving assistance apparatus is improved.

In the second embodiment described above, an example is given where a plurality of preceding vehicles 20 are traveling in lanes different from the host vehicle 10. However, as long as a plurality of traveling tracks can be acquired, one or more preceding vehicles may be traveling on the same lane as the host vehicle. Thus, the flexibility in design of a driving assistance apparatus is improved.

In each embodiment described above, an example is given where the target track TG is formed based on the second traveling track TC2 when the first traveling track TC1 is not detected. However, when a first traveling track TC1 is not detected and, therefore, a separation distance is not stored, a traveling track used for target track formation does not have to be switched to the second traveling track. Thus, the possibility of significant deviation of a target track is reduced and driver discomfort is also reduced.

In the first embodiment described above, an example is given where a preceding vehicle is only one. However, the number of preceding vehicles may be more than one by designing the apparatus such that one used for target track formation is selected from the preceding vehicles. For instance, where there are more than one preceding vehicles, the respective traveling tracks of the preceding vehicles are separately captured, the separation distance between the first traveling track and each traveling track is calculated and stored to be associated with the corresponding second traveling track. By virtue of this, the number of second traveling tracks used for target track formation is increased, thus improving the probability of formation of a target track to serve as a driving assistance apparatus.

In the first embodiment described above, an example is given where a preceding vehicle 20 is traveling in the same lane as the host vehicle 10. However, a preceding vehicle may be traveling in another lane extending in parallel to the lane in which the host vehicle is traveling. Thus, the flexibility in design of a driving assistance apparatus is improved.

In embodiments described above, examples are respectively given where the section A1 is a curved one and the sections A2, A11, and A21 are straight. However, these sections may be curved or straight. The difference in separation distance between the curved and straight sections is not very large. If the difference in separation distance between the straight and curved sections can be known beforehand, a target track may be formed that takes account of the difference. Thus, the flexibility in design of a driving assistance apparatus is improved.

What is claimed is:

1. An apparatus configured to assist in driving of a vehicle in order to cause the vehicle to follow a target track, the apparatus comprising:
    an electric control unit that is programmed to:
    determine a first traveling track along which a first vehicle is able to travel based on road infrastructure;
    determine, determine a second traveling track along which the first vehicle is able to travel based on the traveling track of a second vehicle that precedes the first vehicle;
    store deviation information about deviation between the first traveling track and the second traveling track such that the deviation information corresponds to traveling positions of the vehicles;
    form, based on either the first traveling track or the second traveling track, a target track that the first vehicle is caused to follow; and
    when a base for formation of the target track is switched between the first traveling track and the second traveling track, form the target track based on the deviation information to decrease the deviation between a first target track and a second target track, wherein the first target track is formed based on the first traveling track, and the second target track is formed based on the second traveling track.

2. The apparatus according to claim 1, wherein the road infrastructure is a lane division line marked on a road surface.

3. The apparatus according to claim 1, wherein
    the deviation information includes a separation distance between the first traveling track and the second traveling track, and
    the electronic control unit is further programmed to form, based on the separation distance, the target track to decrease the deviation between the first target track and the second target track.

4. The apparatus according to claim 1, wherein the electronic control unit is further programmed to, when forming a target track at a target vehicle traveling position, if no deviation information corresponding to the target vehicle traveling position is stored, form, based on deviation information stored to correspond to a vehicle traveling position previous to the target vehicle traveling position, the target track based on the second traveling track.

5. The apparatus according to claim 1, wherein the first traveling track is switched to the second traveling track when the first traveling track can no longer be determined.

6. The apparatus according to claim 1, wherein the electronic control unit is further programmed to, on condition that the deviation information is recorded, switch the base for the formation of the target track from the first traveling track to the second traveling track.

7. The apparatus according to claim 1, wherein the electronic control unit is further programmed to, when the first traveling track comes to be detectable during the formation of the target track based on the second traveling track, switch the base for the formation of the target track from the second traveling track to the first traveling track.

8. The apparatus according to claim 7, wherein the electronic control unit is further programmed to:
   in response to the detection of the first traveling track, resume storage of deviation information, and
   form a target track based on the second traveling track and deviation information stored by the resumption of storage of the deviation information, and switches the base for the formation of the target track from the second traveling track to the first traveling track in response to a decrease in deviation between the target track and the first traveling track.

9. The apparatus according to claim 1, wherein
   the second vehicle is one of a plurality of preceding vehicles ahead of the first vehicle, and
   the electric control unit is further programmed to, when the respective traveling tracks of the preceding vehicles are acquired, form the target track by averaging the traveling tracks for each corresponding traveling position.

10. A method for assisting in driving of a vehicle in order to cause the vehicle to follow a target track, comprising:
    by an electronic control unit, determining a first traveling track along which a first vehicle is able to travel based on road infrastructure;
    by the electronic control unit, determining a second traveling track along which the first vehicle is able to travel based on the traveling track of a second vehicle that precedes the first vehicle;
    by the electronic control unit, storing deviation information about deviation between the first traveling track and the second traveling track such that the deviation information corresponds to traveling positions of the vehicles;
    by the electronic control unit, forming, based on either the first traveling track or the second traveling track, a target track that the first vehicle is caused to follow; and
    by the electronic control unit, when a base for formation of the target track is switched between the first traveling track and the second traveling track, forming the target track based on the deviation information to decrease the deviation between a first target track and a second target track, wherein the first target track is formed based on the first traveling track, and the second target track is formed based on the second travelling track.

* * * * *